United States Patent [19]
Sato et al.

[11] Patent Number: 5,462,361
[45] Date of Patent: Oct. 31, 1995

[54] ELECTRORHEOLOGICAL FLUID DAMPER FOR A SLIDE MECHANISM

[75] Inventors: Chuichi Sato; Shigemi Tsukamoto, both of Kanagawa; Hidenori Shinno, Tokyo, all of Japan

[73] Assignee: NSK Ltd., Tokyo, Japan

[21] Appl. No.: 305,892

[22] Filed: Sep. 14, 1994

[30] Foreign Application Priority Data

Sep. 14, 1993 [JP] Japan .................................... 5-252590

[51] Int. Cl.$^6$ .................................................. F16C 29/02
[52] U.S. Cl. .................................................. 384/9; 384/99
[58] Field of Search .................................. 384/9, 99, 40, 384/45, 57; 252/74

[56] References Cited

U.S. PATENT DOCUMENTS

| | | | |
|---|---|---|---|
| 5,201,585 | 4/1993 | Gans et al. | 384/99 |
| 5,219,447 | 6/1993 | Arvidsson | 384/99 |
| 5,281,029 | 1/1994 | Morita | 384/99 |
| 5,294,360 | 3/1994 | Carlson et al. | 252/74 |

Primary Examiner—Lenard A. Footland
Attorney, Agent, or Firm—Sughrue, Mion, Zinn, Macpeak & Seas

[57] ABSTRACT

An electrorheological fluid damper for a slide mechanism including a base and a table, is made up of base-side conductive arcuate pipes different in diameter (serving as a positive electrode), and table-side conductive arcuate pipes different in diameter (serving as a negative electrode) which are arranged alternately in such a manner that they are coaxial with one another, so that the contact areas of the electrodes which are in contact with the electrorheological fluid are increased without increase of the size of the damper itself. When the table is being slid, no voltage is applied to the electrorheological fluid, so that the viscosity of the electrorheological fluid is minimum, being of only its solution, and when the table is stopped, voltage is applied to the electrorheological fluid, so that the viscosity of the electrorheological fluid is increased. Thus, the electrorheological fluid damper requires no high voltage and is not bulky, and is high both in positioning accuracy and in shock absorbing performance.

5 Claims, 11 Drawing Sheets

ELECTRORHEOLOGICAL FLUID DAMPER FOR A SLIDE MECHANISM

BACKGROUND OF THE INVENTION

The present invention relates to an electrorheological fluid damper which is suitable for a slide mechanism used with a machine.

Figure 12:
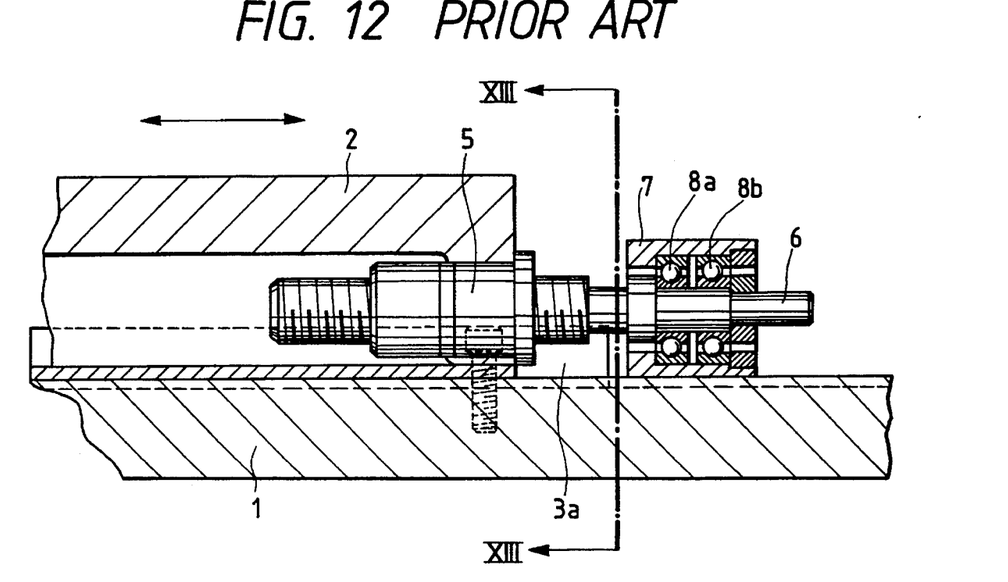
FIG. 12 is a sectional side view of a conventional slide mechanism.
Figure 13:
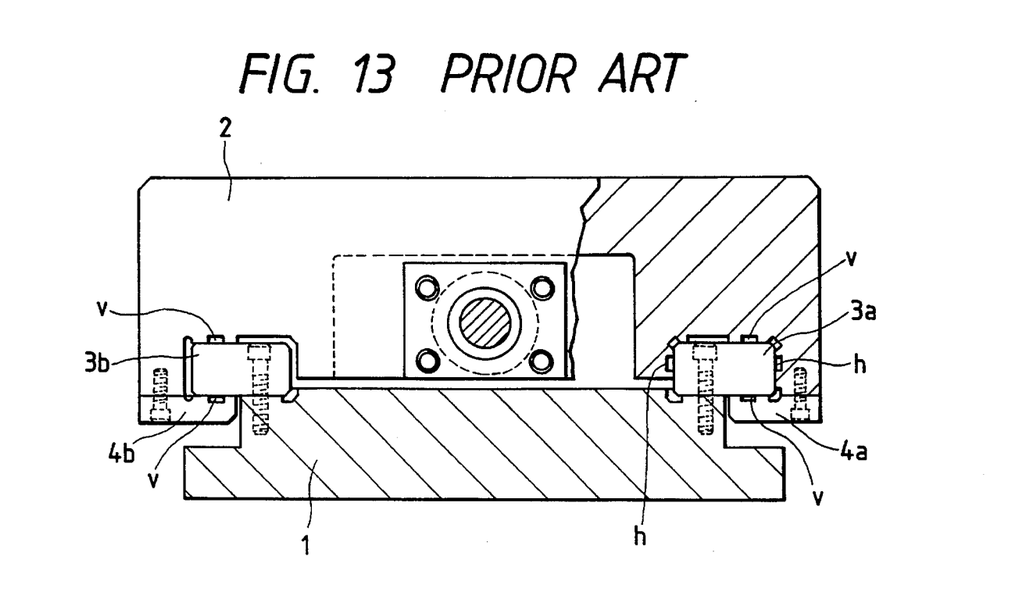
FIG. 13 is a sectional front view of the conventional slide mechanism, taken along line XIII—XIII in FIG. 12.

A conventional slide mechanism for a machine, as shown in FIGS. 12 and 13, provides a base 1 and a table 2. FIG. 12 is a sectional side view of the slide mechanism, and FIG. 13 is a sectional view taken along line XIII—XIII in FIG. 12. In the slide mechanism, the table 2 is horizontally moved with respect to the base 1. Square bars 3a and 3b, on which oil type hydrostatic bearings are formed, are mounted on the base 1. Vertically supporting members 4a and 4b are mounted on the table 2. Horizontal bearing pockets h and vertical bearing pockets v are formed in the surfaces of the table 2 and of the vertically supporting members 4a and 4b which are fixed to the table 2. The bearing pockets h and v filled with oil, form oil type hydrostatic bearings, That is, the table 2 is supported through the oil type hydrostatic bearings on the base 1 in such a manner that it is movable parallel relative to the base 1.

A ball thread nut 5 is coupled to the table 2. A housing 7 and supporting bearings 8a and 8b are mounted on the base 1 to support a ball thread bolt 6, which is coupled to an actuator (not shown) such as a servo motor.

As the ball thread bolt 6 is turned, the table 2 is slid forwardly or reversely as indicated by the arrow in FIG. 12, because the ball thread bolt 6 is threadably engaged with the ball thread nut 5. In this operation, the table 2, being guided by the oil type hydrostatic bearings made up of the bearing pockets h and v filled with oil, is moved parallel. The guide mechanism may be a static pressure bearing, rolling guide, or sliding guide as the case may be. The drive mechanism may be a static pressure screw or friction drive as the case may be.

An oil or air type hydrostatic bearing is advantageous in that it is low in viscous friction, and therefore the table 2 can be positioned with high accuracy. However, it is still disadvantageous in that its damping effect is not so high, and therefore it is liable to be adversely affected by vibration. Hence, the table 2 takes a lot of time until it is positioned as required. When the oil or air type hydrostatic bearing is applied to a working machine, chattering is liable to occur with it. Such a disadvantage is applied to a rolling guide.

On the other hand, a sliding guide is high in friction, and therefore it is high in damping effect. However, it suffers from disadvantages that, because of the high friction and the difference between static friction and dynamic friction, stick slip may occur; that is, it is low in positioning accuracy. Furthermore, since its friction is high, the table cannot be quickly moved without great power, which results in the generation of heat.

In order to overcome the above-described difficulties, the present inventors have conducted intensive research on the slide mechanism, and reached the finding that those difficulties can be eliminated by variably controlling the frictional force. In the slide mechanism, the frictional force for obtaining the damping effect is applied to a moving object; however, it is rather difficult to variably control the frictional force applied to the moving object. Therefore, the present inventors have conducted various research on a method of variably controlling the frictional force applied to the moving object, and reached an idea of using an electrorheological fluid whose apparent viscosity changes with the strength of electric field.

However, in order to obtain the viscosity of electrorheological fluid which can be practically used, it is necessary to apply high voltage to it. The use of high voltage naturally limits the material of electrodes to be used, the kind of power source, and so forth, which increases the manufacturing cost. This difficulty may be overcome as follows: That is, the viscous frictional force provided by the electrorheological fluid may be increased without application of high voltage by increasing the contact areas of the electrodes which are in contact with the electrorheological fluid. However, the increasing of the contact areas of the electrodes gives rise to another problem that, if the contact areas of the electrodes were merely increased, then the resultant device would be unavoidably bulky.

SUMMARY OF THE INVENTION

An object of the present invention is to provide an electrorheological fluid damper for a slide mechanism which requires no high voltage and is not bulky, and which is high both in positioning accuracy and in shock absorbing performance.

The foregoing object and other objects of the present invention have been achieved by the provision of an electrorheological fluid damper for a slide mechanism which is adapted to absorb a shock which may be produced in determining the relative position of a first object and a second object which are moved parallel one relative to the other, in which, according to the present invention, the electrorheological fluid damper provides: a first electrode plate connected to the first object, serving as a positive electrode; a second electrode plate connected to the second object, serving as a negative electrode; electrorheological fluid filled in a space defined by the first and second electrode plates; and a voltage control device for variably controlling voltage applied across the first and second electrode plates.

The first electrode plate serving as the positive electrode has a plurality of conductive plates, and the second electrode plate serving as the negative electrode also has a plurality of conductive plates. The first and second electrode plates are arranged alternately, so that the limited space is effectively utilized, and the contact areas of the electrodes which are in contact with the electrorheological fluid are increased as much as possible. Hence, the viscous frictional force provided by the electrorheological fluid may be increased to a practical value without application of high voltage to it and without increase of the size of the damper itself.

The voltage control device controls that no voltage is applied to the electrode plates of the positive and negative electrodes when the first object is being slid relative to the second object. Thus, the viscosity of the electrorheological fluid is minimum so that the slide velocity is not reduced. Further, the voltage control device controls that when the slide operation is ended, predetermined voltage is applied to the electrorheological fluid so that the viscosity of the electrorheological fluid is increased to thereby obtain a damping force as desired. Thus, the electrorheological fluid damper requires no high voltage and is not bulky, and is high both in positioning accuracy and in shock absorbing performance.

DETAILED DESCRIPTION OF THE PREFERRED EMBODIMENTS

Preferred embodiments of the present invention will be described with reference to FIGS. 1 through 11.

First Embodiment

Figure 1:
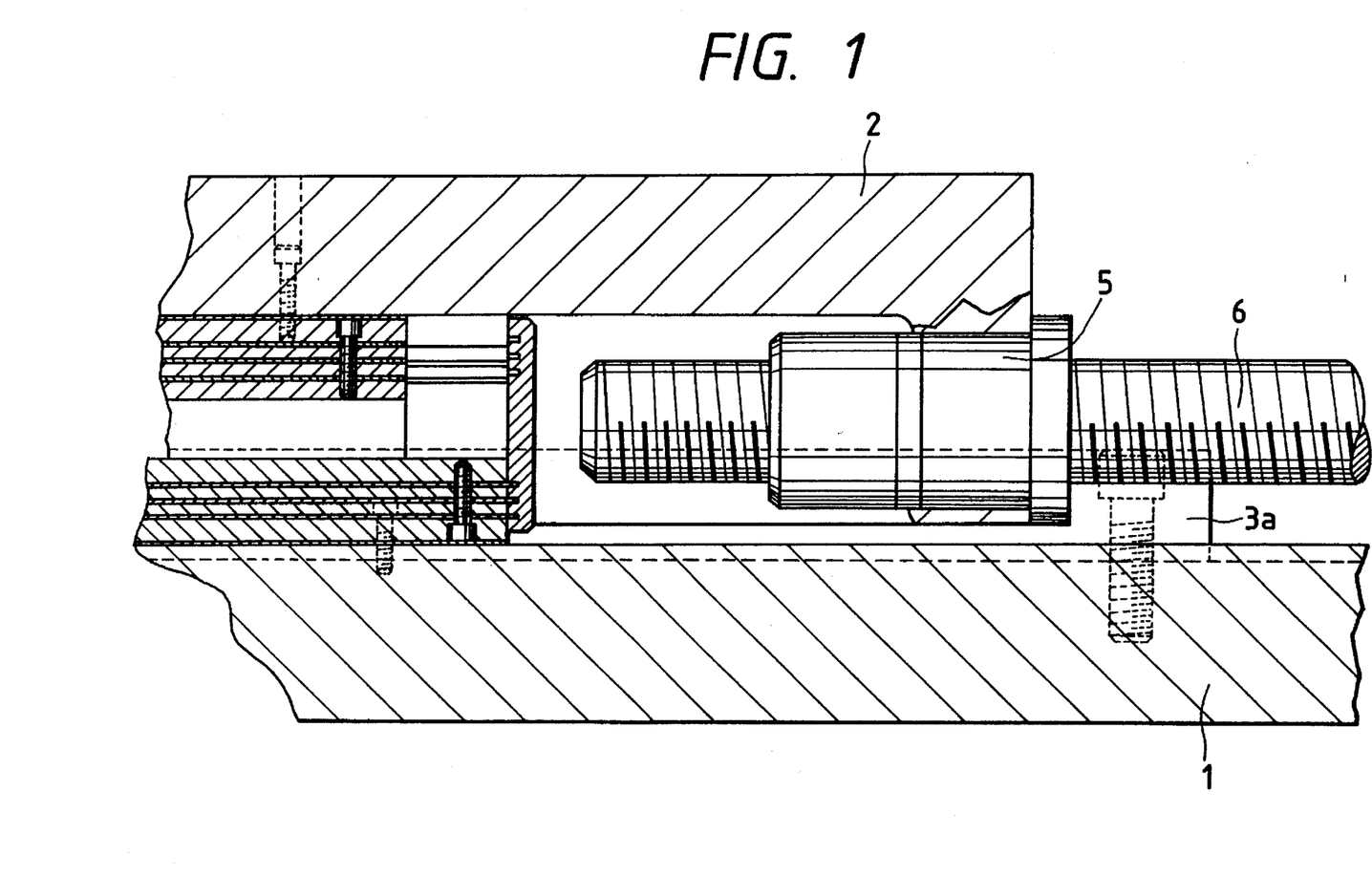
FIG. 1 is a sectional side view showing a slide mechanism to which an example of an electrorheological fluid damper is applied, which constitutes a first embodiment of the present invention.
Figure 2:
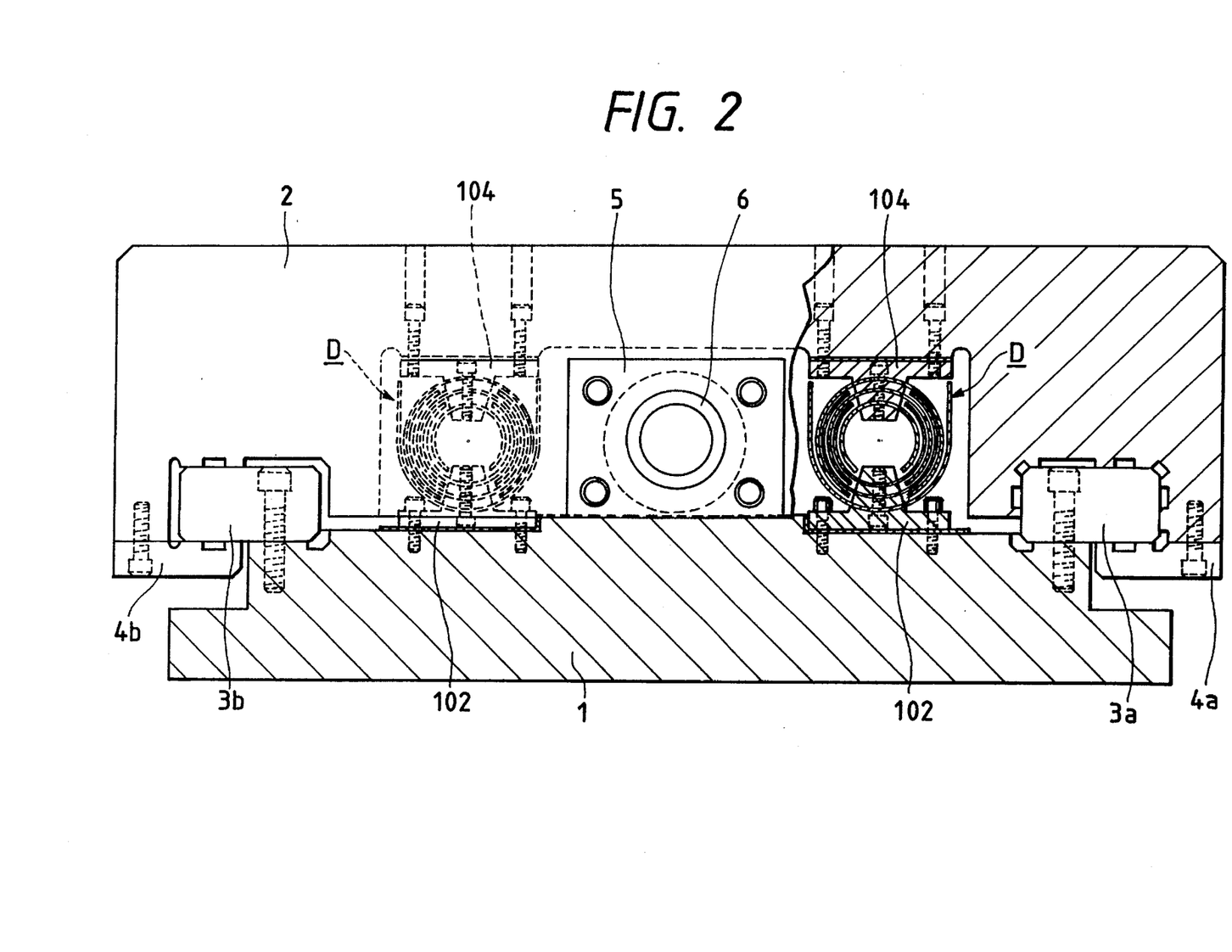
FIG. 2 is a front view of the slide mechanism shown in FIG. 1.

A pair of electrorheological fluid dampers, a first embodiment of the present invention, are applied to a slide mechanism as shown in FIGS. 1 and 2. As is apparent from the comparison of FIGS. 1 and 2 with FIGS. 12 and 13 showing the conventional slide mechanism, the electrorheological fluid dampers D according to the present invention are surrounded by the housing 7 and the right and left square bars 3b and 3a, and the other arrangements are the same as those which have been described with reference to FIGS. 12 and 13.

Figure 3:
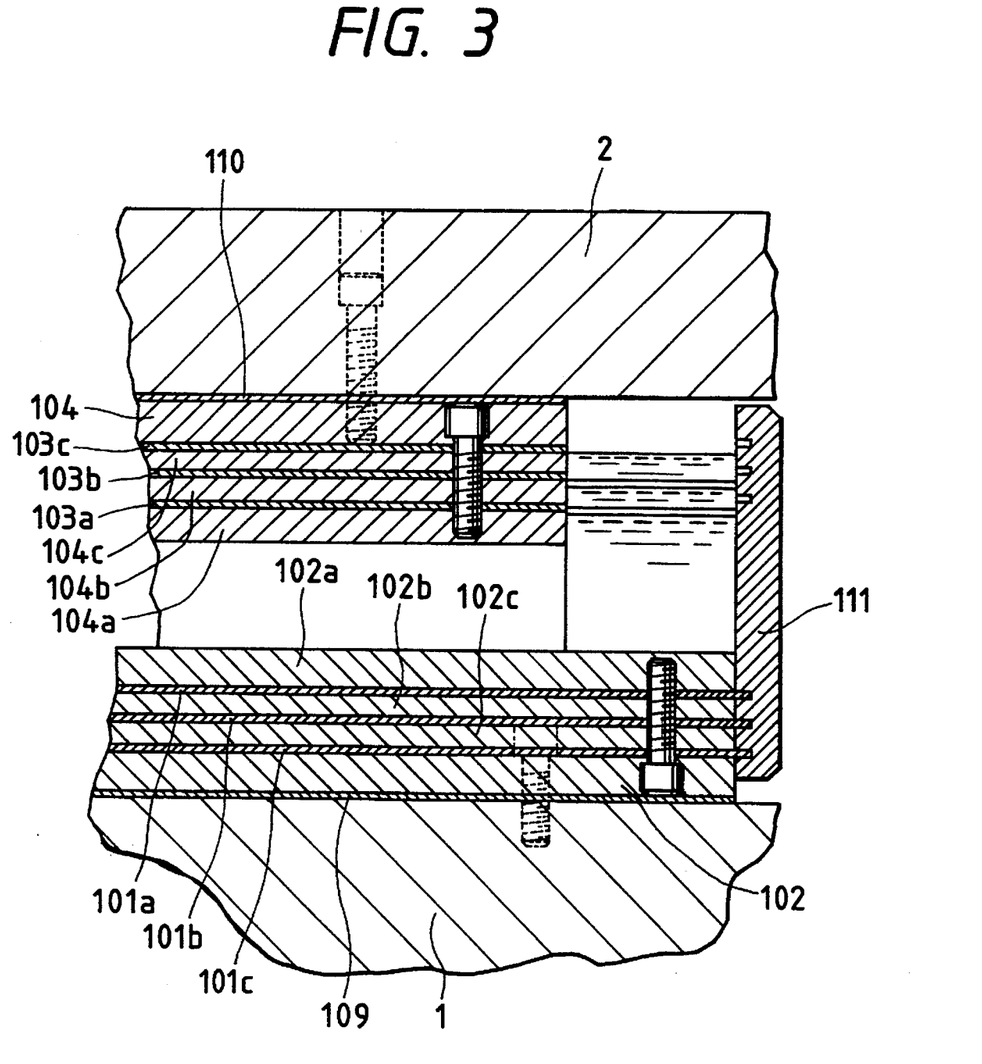
FIGS. 3 and 4 are a sectional side view and a front view of the electrorheological fluid damper shown in FIGS. 1 and 2, respectively.
Figure 4:
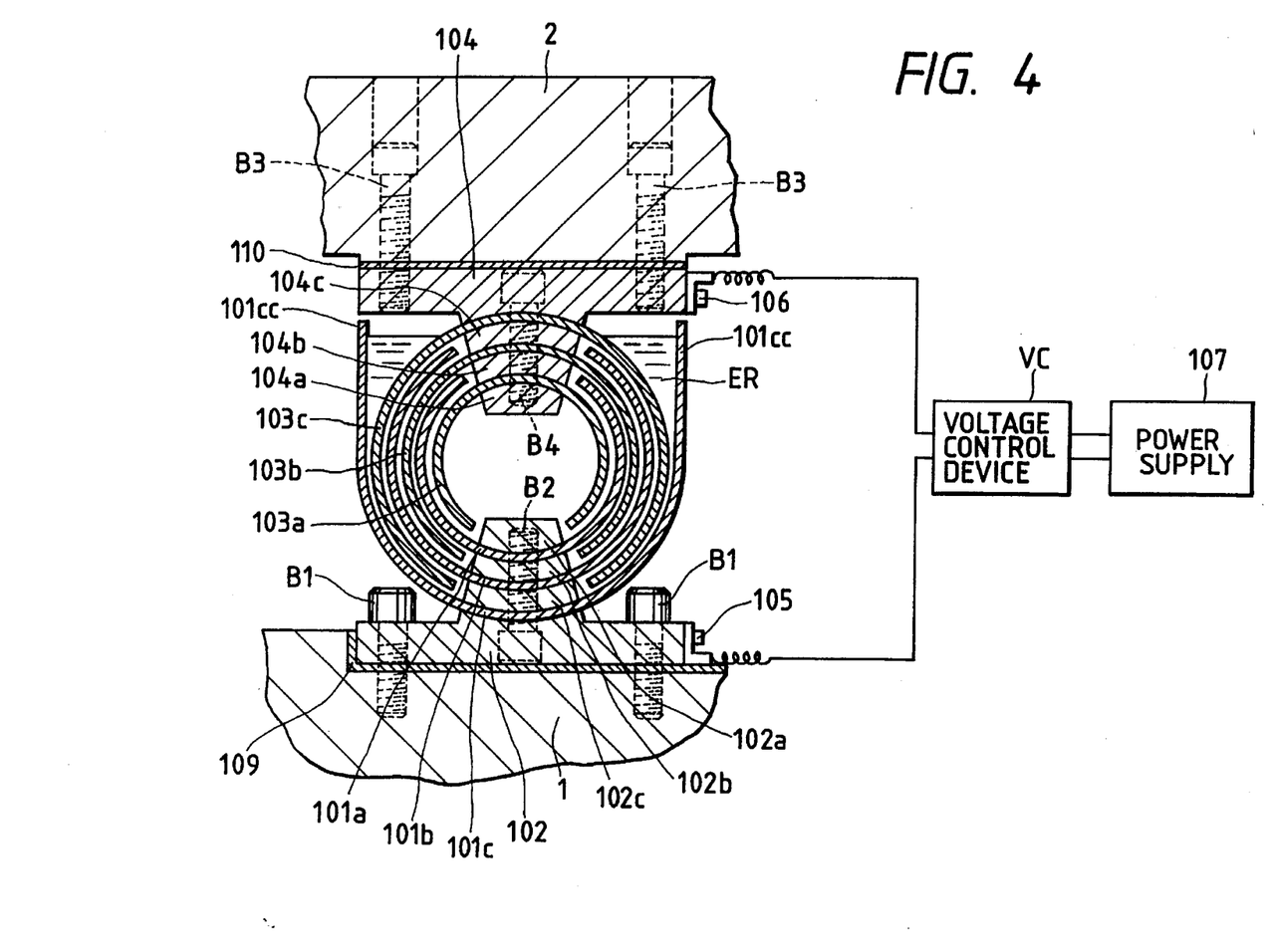

Each of the electrorheological fluid dampers D is as shown in FIGS. 3 and 4.

As shown in FIGS. 3 and 4, a conductive mounting member 102 is fixedly mounted through an insulating spacer 109 on the base 1 with bolts B1. Base-side conductive arcuate pipes 101a, 101b and 101c, which are arcuate in section, are mounted through conductive spacers 102a, 102b and 102c on the conductive mounting member 102 with bolts B2. On the other hand, a conductive mounting member 104 is fixedly mounted through an insulating spacer 110 on the table 2 with bolts B3. Table-side conductive arcuate pipes 103a, 103b and 103c, which are also arcuate in section, are mounted through conductive spacers 104a, 104b and 104c on the conductive mounting member 104 with bolts B4.

The base-side conductive arcuate pipes 101a through 101c and the table-side conductive arcuate pipes 103a through 103c are different in diameter from one another, and they are arranged alternately in such a manner that they are coaxial with one another. Both side portions 101cc of the base-side conductive arcuate pipe 101c are zero (0) in curvature; that is, they are linear, thus serving as a casing for holding an electrorheological fluid ER.

As shown in FIG. 3, the base-side conductive arcuate pipes 101a, 101b and 101c are longer than the table-side electrically conductive arcuate pipes 103a, 103b and 103c. Electrically non-conductive caps 111 are engaged with both ends (only one end shown in FIG. 3) of each of the base-side conductive arcuate pipes 101a, 101b and 101c. The space defined by the electrically non-conductive caps 111 and the base-side conductive arcuate pipe 101c is filled with the electrorheological fluid ER. The difference in axial length between the base-side conductive arcuate pipes 101a, 101b and 101c and the table-side conductive arcuate pipes 103a, 103b and 103c, corresponds to an axial slide stroke.

The voltage of a power supply 107 is applied to a voltage control device VC, so that it is increased to a plurality of higher voltage values which are selectively applied across the conductive mounting members 102 and 104 to change the strength of the electric field applied to the electrorheological fluid. As described above, the base-side conductive arcuate pipes 101a, 101b and 101c and the table-side conductive arcuate pipes 103a, 103b and 103c are mounted respectively through the conductive spacers 102a, 102b and 102c and the conductive spacers 104a, 104b and 104c on the conductive mounting members 102 and 104, and therefore those arcuate pipes serve as electrodes. Thus, the base-side conductive arcuate pipes 101a, 101b and 101c may be a positive electrode and the table-side conductive arcuate pipes 103a, 103b and 103c a negative electrode, and vice versa.

Figure 5:
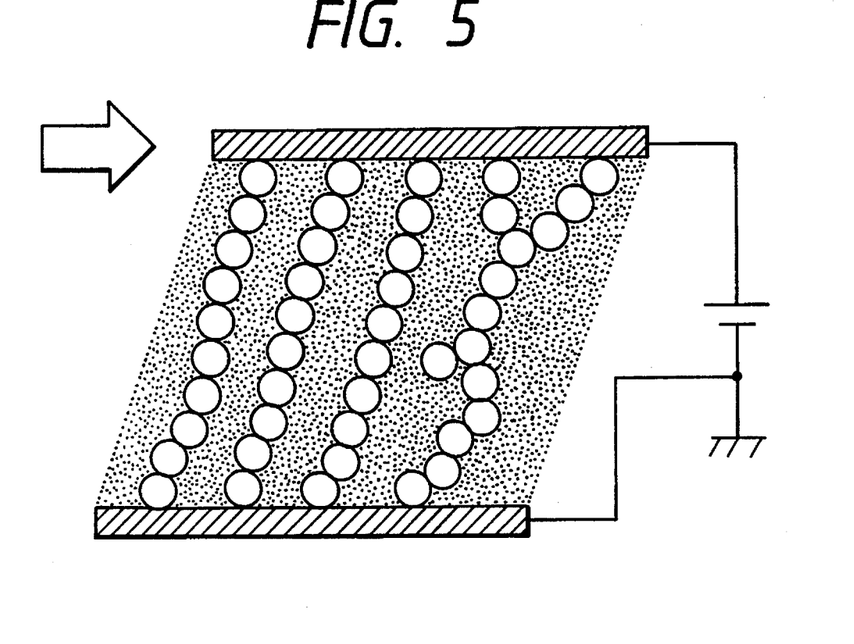
FIG. 5 is an explanatory diagram for a description of the resistance force against relative slide which is provided by the viscosity of an electrorheological fluid.
Figure 6:
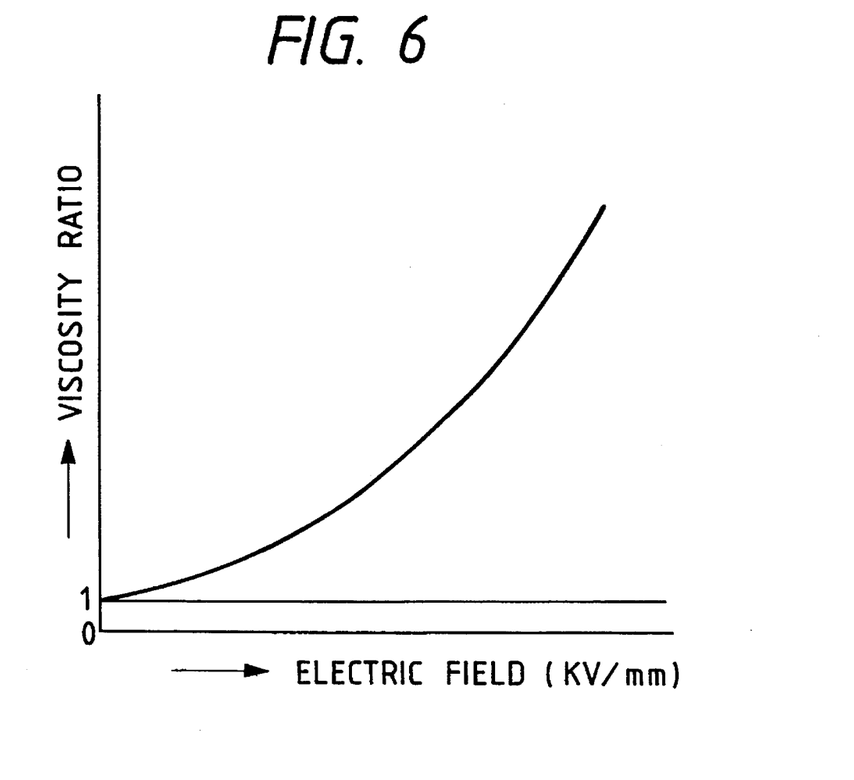
FIG. 6 is a graphical representation indicating the variations in viscosity of the electrorheological fluid.

The properties of an ER suspension (electrorheological fluid which usually consist of dielectric particles suspended in oil) as one example of the electrorheological fluid, will be described. The ER suspension is a solution in which particles are dispersed. As shown in FIG. 5, when voltage is applied to the ER suspension, a resistance force against relative slide is produced to act on the dispersed particles, so that the apparent viscosity is changed. That is, as shown in FIG. 6, the ER suspension has a property that its viscosity becomes much larger than the viscosity of the solution itself (viscosity ratio=1) depending on the strength of the electric field. This means that, where the ER suspension is applied to the slide mechanism as in the embodiment of the present invention, the viscosity of the ER suspension provides a resistance force in proportion to the velocity of relative slide (a viscous frictional force). Thus, the ER suspension is ideal for a damper in the direction of slide.

Other examples of the ER suspension are, for instance, liquid crystal and ion exchange resin. They can be applied to the present invention.

As described above, with the electrorheological fluid ER, the viscous frictional force against relative slide can be increased depending on the strength of the electric field; however, in order to obtain the viscosity which is large enough to provide a damper for a slide mechanism, it is necessary to greatly increase the strength of electric field applied to the electrorheological fluid. This requirement may be satisfied by increasing the voltage applied thereto. However, the method is not practical in use, because the increasing of the voltage limits the electrodes in material and the power source in performance.

In view of the foregoing, the method of increasing the contact areas of the electrodes which are in contact with the electrorheological fluid ER, should be employed. However, merely increasing the contact areas of the electrodes is not practical, because it cannot be achieved without increasing the size of the slide mechanism. Hence, in the embodiment of the present invention, the base-side conductive arcuate pipes 101a, 101b and 101c and the table-side conductive arcuate pipes 103a, 103b and 103c which are different in diameter from one another, are arranged alternately in such a manner that they are coaxial with one another, as described above. This arrangement of the conductive arcuate pipes increases the contact areas of the electrodes which are in contact with the electrorheological fluid ER without increasing the size of the damper itself. Hence, the viscous resistance force can be increased to a practical value, although the voltage applied to the electrorheological fluid through the voltage control device VC is not increased so much or the damper itself is not increased in size.

Now, the distance H between the base-side conductive arcuate pipes 101a, 101b and 101c (the electrode) and the table-side conductive arcuate pipes 103a, 103b and 103c (the electrode) will be described in relation thereto. The electrorheological fluid ER provides not only the damping effect against the relative slide along the axis, but also a dynamic pressure effect in a direction perpendicular to the axis.

That is, a relative slide damping force F0 can be represented by the following expression (1):

$$F0 \propto \mu \cdot V/H \quad (1)$$

where V is the relative slide velocity, and $\mu$ is the viscosity of the electrorheological fluid ER.

A force F1 produced by the dynamic pressure effect is represented by the following expression (2):

$$F1 \propto \mu \cdot V/H \quad (2)$$

As is apparent from the above-described expression (2), as the distance H between the electrodes increases, the force F1 produced by the dynamic pressure effect is reduced to a negligibly small value, so that the guide in the direction perpendicular to the axis is never adversely affected in accuracy. The increasing of the distance H makes it simpler to assemble the arcuate pipes. In practice, the distance H between the electrodes is 0.2 mm to 1.0 mm.

As is seen from the above-described expression (1), the relative slide damping force F0 is proportional to the relative slide velocity V. Hence, when the relative slide velocity V is high and the vibration to be absorbed is great, advantageously the damping effect is also great.

Furthermore, the relative slide damping force is proportional to the viscosity $\mu$ of the electrorheological fluid ER. Hence, while the table 2 is being slid, the power consumption required for obtaining the relative slide velocity V is reduced as follows: That is, no voltage is applied to the electrorheological fluid ER, so that the viscosity of the electrorheological fluid ER is made minimum, being only the viscosity of the solution thereof; that is, the frictional force is reduced during the sliding operation, whereby the power consumption required for obtaining the relative slide velocity V is decreased. When, on the other hand, the sliding operation is ended, voltage is applied to the electrorheological fluid ER, to increase the viscosity of the electrorheological fluid ER thereby to obtain a damping force as desired. Thus, the electrorheological fluid damper according to the present invention is high both in positioning accuracy and in shock absorbing performance.

By varying the voltage applied to the electrorheological fluid ER in accordance with the relative slide velocity V, the damping control can be made more finely. Such a voltage control can be achieved by the voltage control device VC.

Figure 7:
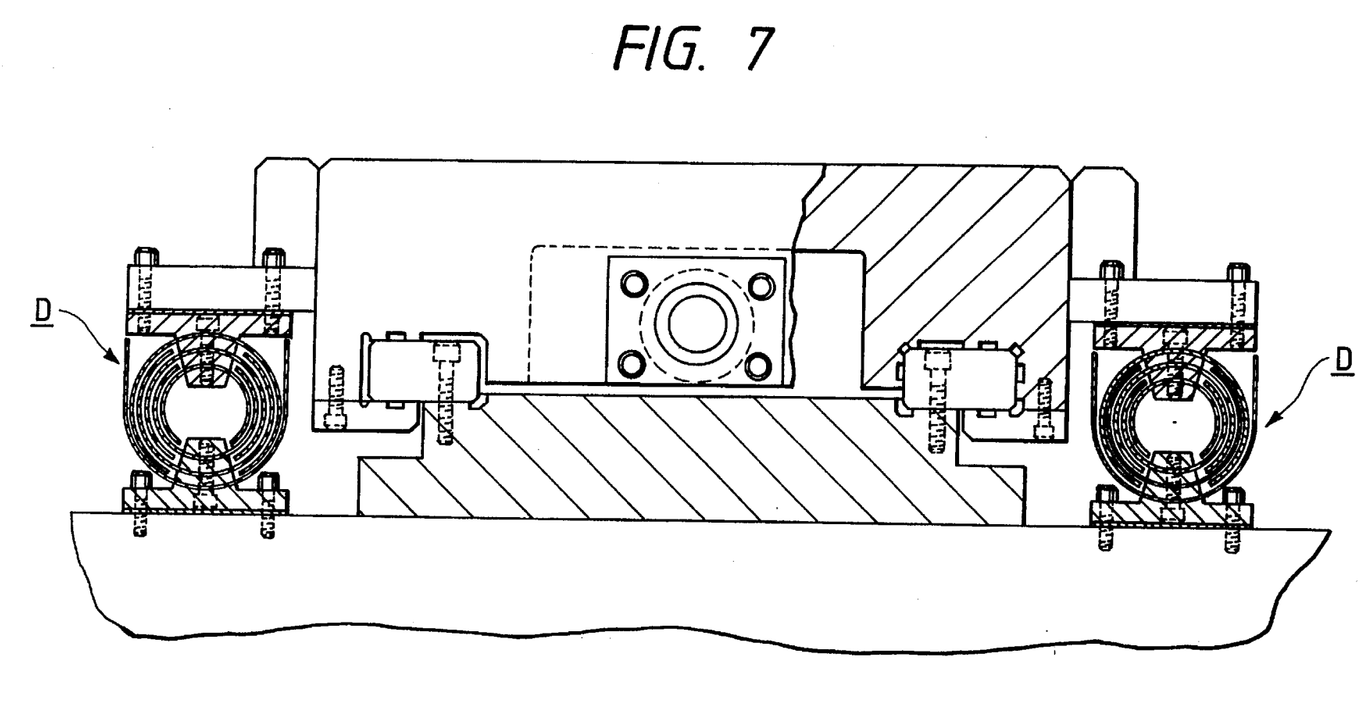
FIG. 7 is a front view of a slider system, showing one modification of the first embodiment of the present invention.

One modification of the above-described first embodiment is as shown in FIG. 7. The modification is different from the first embodiment shown in FIGS. 1 and 2 as follows: In the first embodiment, the electrorheological fluid dampers D are surrounded by the housing 7 and the right and left square bars 3b and 3a; whereas in the modification shown in FIG. 7, the electrorheological fluid dampers D are provided outside the right and left square bars 3b and 3a.

Second Embodiment

Figure 8:
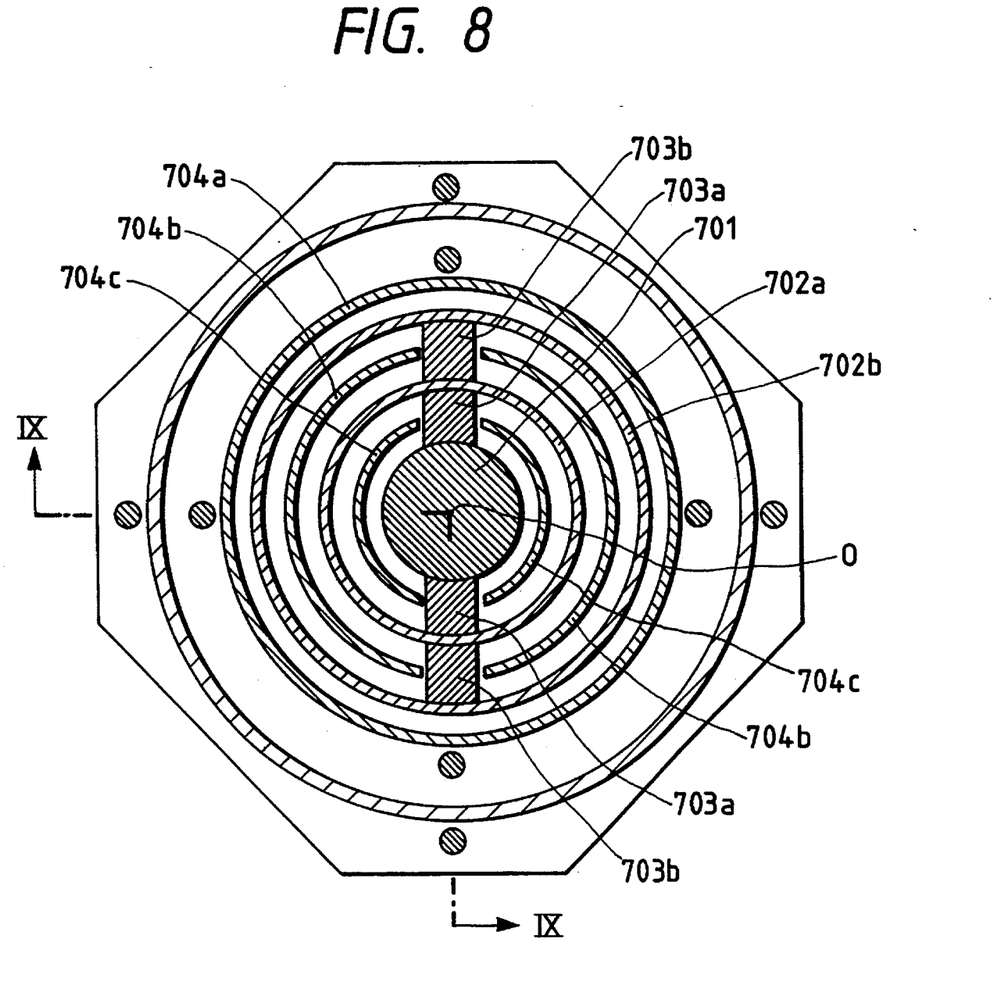
FIG. 8 is a sectional plan view of another example of the electrorheological fluid damper, which constitutes a second embodiment of the present invention.
Figure 9:
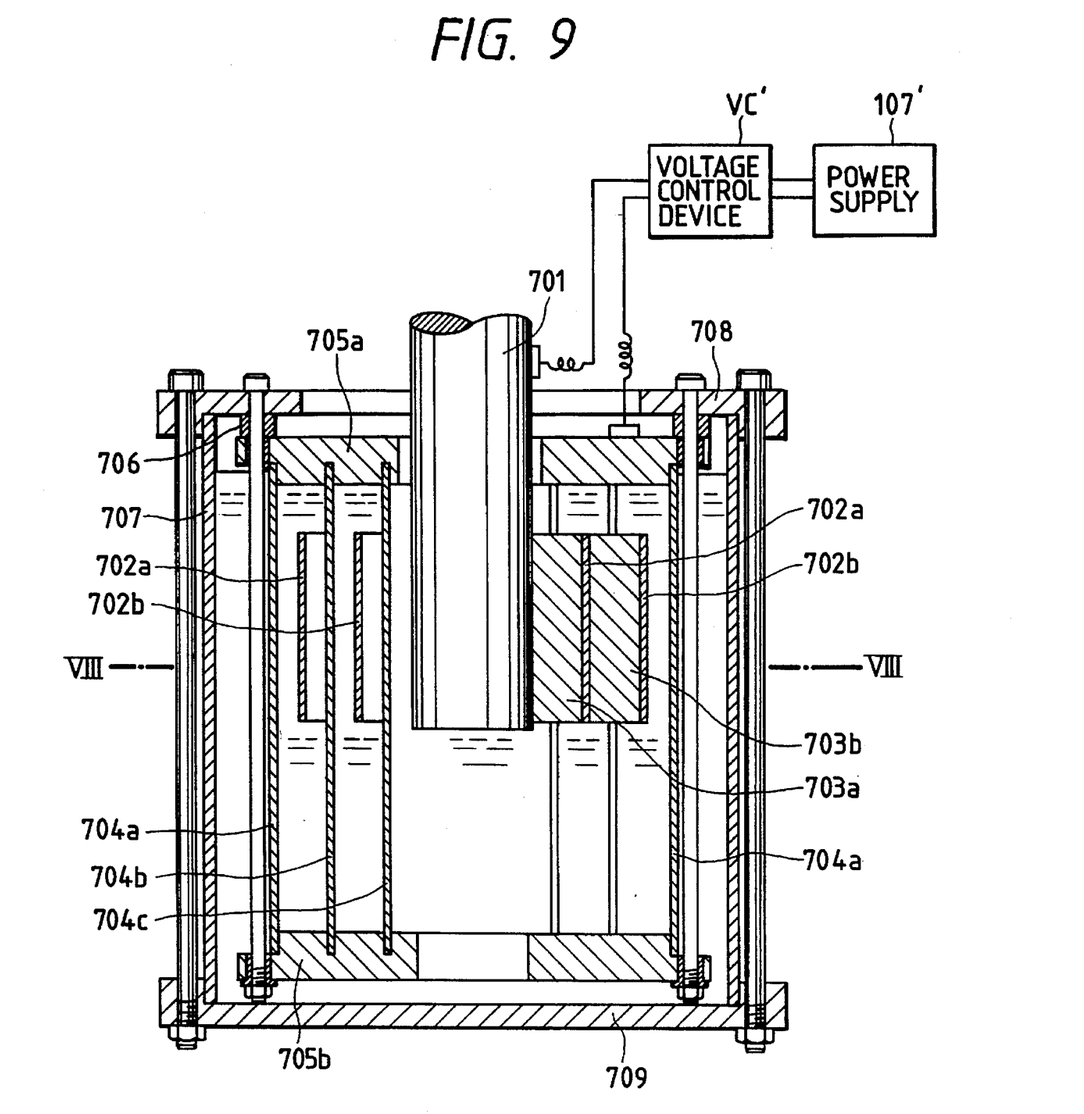
FIG. 9 is a sectional side view of the electrorheological fluid damper, taken along line IX-O-IX in FIG. 8.

FIGS. 8 and 9 shows another example of the electrorheological fluid damper, which constitutes a second embodiment of the present invention. The second embodiment is provided for a slide mechanism which is guided vertically. FIG. 8 is a sectional plan view taken along line VIII—VIII in FIG. 9, and FIG. 9 is a sectional side view taken along line IX-O-IX in FIG. 8;

In FIGS. 8 and 9, reference numeral 701 designates a vertical shaft supporting a vertical slide (not shown). The shaft 701 also serves as an electrode. Slide-side conductive pipes 702a and 702b are mounted through conductive spacers 703a and 703b on the vertical shaft 701, so that the slide-side conductive pipes 702a and 702b, the conductive spacers 703a and 703b, and the vertical shaft 702 are vertically movable as one unit.

As shown in FIG. 9, a stationary-side conductive pipe 704a and stationary-side conductive arcuate pipes 704b and 704c, which are arcuate in section, are connected to upper and lower end members 705a and 705b. The slide-side conductive pipes 702a and 702b, the stationary-side conductive pipe 704a, and the stationary-side conductive arcuate pipes 704b and 704c are so arranged as to be coaxial with the vertical shaft 701. A cylindrical fluid casing 707 is closed with upper and lower lids 708 and 709 at both ends. The aforementioned upper and lower conductive end members 705a and 705b are electrically insulated from the fluid casing 707 by insulating spacers 706. Each of the upper and lower conductive end members 705a and 705b has a through-hole at the center, so that, even when voltage is applied to the electrorheological fluid ER, the excess of electrorheological fluid ER is freely allowed to flow inside and outside the upper and lower conductive end members 705a and 705b through the central through-holes.

With the aid of a power source 107' and a voltage control device VC', voltage is applied directly across the vertical shaft 701 and the upper conductive end member 705a. The voltage thus applied is supplied to the slide-side conductive pipes 702a and 702b, the stationary-side conductive pipe 704a and the stationary-side conductive arcuate pipes 704b and 704c. As a result, the slide-side conductive pipes 702a and 702b act as a positive electrode (or a negative electrode), while the stationary-side conductive pipe 704a and the stationary-side conductive arcuate pipes 704b and 704c act as a negative electrode (or a positive electrode).

As is apparent from the above description, in the second embodiment, similarly as in the first embodiment, the limited space is utilized effectively, and the contact areas of the electrodes which are in contact with the electro-acoustic fluid ER in the space are increased as much as possible. Thus, the electrorheological fluid damper used with the slide mechanism which is slid vertically, has the same effects as the first embodiment.

Third Embodiment

Figure 10:
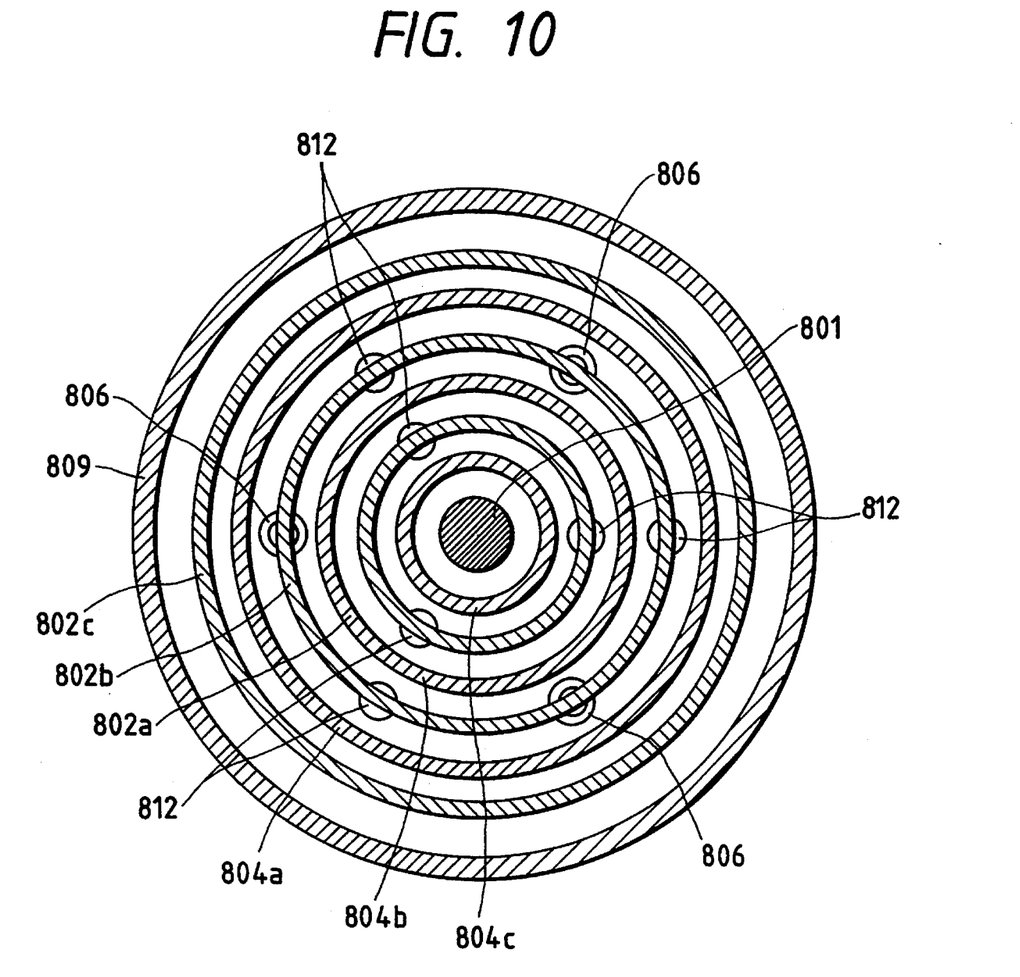
FIG. 10 is a sectional plan view of another example of the electrorheological fluid damper, which constitutes a third embodiment of the present invention.
Figure 11:
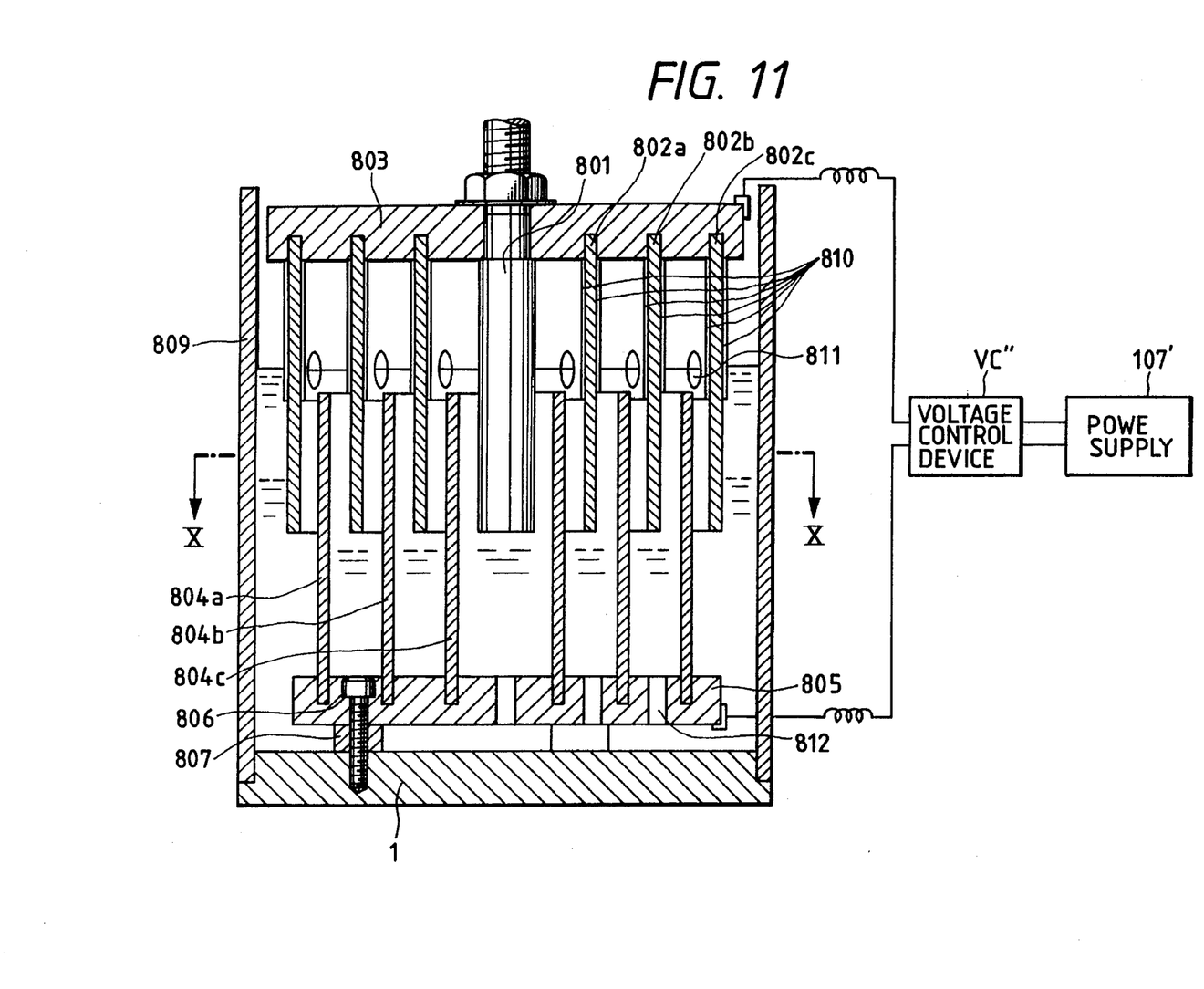
FIG. 11 is a sectional side view of the electrorheological fluid damper shown in FIG. 10.

FIGS. 10 and 11 show another example of the electrorheological fluid damper, which constitutes a third embodiment of the present invention. Similarly as in the case of the second embodiment of the present invention, the damper is used in guiding the slide mechanism vertically. FIG. 10 is a sectional plan view taken along line X—X in FIG. 11, and FIG. 11 is a sectional side view of the electrorheological fluid damper shown in FIG. 10;

In FIGS. 10 and 11, reference numeral 801 designates a vertical shaft supporting a vertical slide (not shown). The shaft 801 also serves as an electrode. An upper conductive end member 803 is secured to the shaft 801. Slide-side conductive pipes 802a, 802b and 802c are secured to the upper conductive end member 803. That is, the upper conductive end member 803, the slide-side conductive pipes 802a, 802b and 802c, and the shaft 801 are vertically movable as one unit.

The electrorheological fluid damper further provides: a lower conductive end member 805, to which stationary-side conductive pipes 804a, 804b and 804c are secured. The above-described slide-side conductive pipes 802a, 802b and 802c and the stationary-side conductive pipes 804a, 804b and 804c are alternately arranged around the shaft 801 in such a manner that they are coaxial with the shaft 801. The lower conductive end member 805 is fixedly secured through insulating spacers 806 and 807 to the base 1 with bolts. In addition, a cylindrical fluid casing 809 is fixedly secured to the base 1. Through-holes 811 are formed in the slide-side conductive pipes 802a, 802b and 802c, while through-holes 812 are formed in the lower conductive end member 805, so that, even when voltage is applied to the electrorheological fluid ER, the excess of electrotheological fluid ER is freely allowed to flow.

The inner and outer surfaces of the upper portion of each of the slide-side conductive pipes 802a, 802b and 802c are covered with insulating films 810. This is to eliminate the difficulty that the confronting areas of the slide-side conductive pipes 802a, 802b and 802c and the stationary-side conductive pipes 804a, 804b and 804c, which are confronted with each other, are changed in accordance with the movement of the vertical shaft 801 so that the damping force attributing to the electrorheological fluid ER is changed.

In the third embodiment, with the aid of a power source 107" and a voltage control device VC", voltage is applied directly across the upper and lower conductive end members 803 and 805. The voltage thus applied is supplied to the slideside conductive pipes 802a, 802b and 802c and the stationary-side conductive pipes 804a, 804b and 804c. Thus, the slide-side conductive pipes 802a, 802b and 802c act as a positive electrode (or a negative electrode), while the stationary-side conductive pipes 804a, 804b and 804c act as a negative electrode (or a positive electrode).

As is apparent from the above description, in the third embodiment too, similarly as in the first and second embodiment, the limited space is utilized effectively, and the areas of the electrodes which are in contact with the electroacoustic fluid ER in the space are increased as much as possible. Thus, the electrorheological fluid damper used with the slide mechanism which is slid vertically, has the same effects as the first and second embodiments.

In the third embodiment, the inner and outer surfaces of the upper portion of each of the slide-side conductive pipes 802a, 802b and 802c are covered with the insulating films 810; however, the present invention is not limited thereto or thereby. That is, the provision of the insulating films is to suppress the variations of the confronting areas of the slide-side conductive pipes 802a through 802c and the stationary-side conductive pipes 804a through 804c, and therefore the insulating films may be formed on the inner and outer surfaces of the upper portions of each of the stationary-side conductive pipes 804a through 804c instead of the slide-side conductive pipes 802a, 802b and 802c. And, in the case where the variations of the damping force raise no problem, it is not always necessary to form the insulating films on the pipes.

In the above-described first, second and third embodiment, in order to increase the confronting areas of the electrodes, the electrodes are cylindrical and are arranged alternately. However, the electrodes thus arranged may be polygonal, or of flat plates.

As is apparent from the above description, the electrorheological fluid damper according to the present invention requires no high voltage and is not bulky, and is high both in positioning accuracy and in shock absorbing performance.

What is claimed is:

1. An electrorheological fluid damper for a slide mechanism adapted to move a first object relative to a second object, comprising:

a first electrode plate mounted on the first object;

a second electrode plate mounted on the second object;

electrorheological fluid filled in a space defined by the first electrode plate and the second electrode plate; and a voltage control device for variably controlling voltage applied to the electrorheological fluid across the first electrode plate and the second electrode plate.

2. The electrorheological fluid damper of claim 1, wherein the first electrode plate and the second electrode plate comprise conductive arcuate pipes, respectively, the conductive arcuate pipes being different in diameter from one another and being arranged alternately so as to be coaxial with one another.

3. The electrorheological fluid damper of claim 1, wherein the voltage control device applies the voltage to the electrotheological fluid in accordance with a velocity of relative slide between the first object and the second object, and the voltage control device is so operative that the voltage is not applied to the electrorheological fluid while the first object is moved relative to the second object.

4. The electrorheological fluid damper of claim 1, wherein the voltage control device applies the voltage to the electrorheological fluid in accordance with a velocity of relative slide between the first object and the second object, and the voltage control device is so operative that the voltage is applied to the electrorheological fluid if the first object is prevented from being moved relative to the second object.

5. The electrorheological fluid damper of claim 1, wherein a surface of the second electrode is partially covered with an insulating film to suppress variations of confronting areas of the first electrode plate and the second electrode plate in accordance with a movement of the second object.

* * * * *